United States Patent [19]

Togo et al.

[11] 3,905,229

[45] Sept. 16, 1975

[54] TEMPERATURE COMPENSATING SYSTEM

[75] Inventors: Masaaki Togo, Kawasaki; Nobuo Takeuchi, Inagi, both of Japan

[73] Assignee: Honeywell Inc., Minneapolis, Minn.

[22] Filed: Sept. 26, 1973

[21] Appl. No.: 401,066

[30] Foreign Application Priority Data

Oct. 9, 1972 Japan.............................. 47-100633

[52] U.S. Cl......... 73/194 E; 73/231 M; 235/151.34
[51] Int. Cl.......................... G01f 1/00; G01f 15/02
[58] Field of Search......... 73/194 E, 194 M, 231 M, 73/233, 362 A, 362 R; 235/151.34

[56] References Cited
UNITED STATES PATENTS

| | | | |
|---|---|---|---|
| 3,537,312 | 11/1970 | Moore .................................. | 73/231 |
| 3,568,044 | 3/1971 | Elazar................................... | 323/75 |
| 3,588,481 | 6/1971 | Stroman......................... | 235/151.34 |
| 3,621,716 | 11/1971 | Rosso................................... | 73/231 |
| 3,688,581 | 9/1972 | Quernec .............................. | 73/362 |
| 3,700,865 | 10/1972 | Ley....................................... | 73/231 |
| 3,729,995 | 5/1973 | Kovacs.................................. | 73/194 |

OTHER PUBLICATIONS

IBM Technical Disclosure Bulletin, "Thermistor Temperature to Current Transducer" by Oswald, Vol. 7, No. 12, 5/65.

*Primary Examiner*—Herbert Goldstein
*Attorney, Agent, or Firm*—Arthur H. Swanson; Lockwood D. Burton

[57] ABSTRACT

A flow meter system including a temperature sensitive transducer is provided for referring to a selected reference base or standard temperature flow measurements made of fluids at temperatures encountered in the process industries, which fluids have temperature coefficients of volume expansion producing changes in volume with changes in temperature. The system also provides a correction factor for a non-linear characteristic of the transducer.

7 Claims, 9 Drawing Figures

TEMPERATURE COMPENSATING SYSTEM

BACKGROUND OF THE INVENTION

1. Field of the Invention

This invention relates to temperature corrected flowmeters and particularly to an improved automatic temperature compensating system that is effective to translate a fluid flow pulse signal generated by a volume flow meter or turbine meter at an existing or ambient temperature into an equivalent flow signal at a predetermined base or standard temperature, for example, 15° Centrigrade (C.). Such temperature corrected flow measurement systems are generally classified in the United States Patent Office in CLASS 73, MEASURING AND TESTING, SUB CLASS 194, VOLUME OR RATE OF FLOW METER and in CLASS 235, REGISTERS, SUB CLASS 151.34, CALCULATORS, fluid flow. The system according to the present invention also includes means to provide a correction for the non-linear characteristic of the transducer that is employed to respond to the fluid temperature.

2. Description of the Prior Art

Fluid flow meters have long been used for measuring the flow of fluids such as gas, steam and oil and other products including powders flowing in conduits. Generally such flow measurements are uncorrected for variations in the temperature of the fluid although many of the fluids under measurement are subjected to temperature changes and change in volume with such changes. Additionally, while others have proposed the conversion of a pulse flow signal at the conduit for the existing or ambient temperature into an equivalent flow rate signal at a reference base or standard temperature, such systems have required the use of a fluid temperature responsive element having a linear characteristic. Such elements, as is known, do not have the bests corrosive resistant characteristics. There thus has existed a need for a more accurate and economical temperature compensating system (a) which is simple and free from complex operating problems, (b) in which fluid temperature responsive resistance elements having better corrosion resistant properties (but undesirable non-linear characteristics within the range of fluid temperature variation) may be employed, and (c) which is especially useful in applications involving a plurality of separate fluid measurements.

SUMMARY OF THE INVENTION

In accordance with the present invention, a temperature compensating system is provided for automatically correcting or referring a fluid volume measurement made at an existing condition likely to be encountered in practice in the process industries to a selected reference base or standard condition. As is well known, the volume of fluids generally increase with a rise in temperature and decrease upon a drop in temperature. This is due to the positive temperature coefficient of expansion of such fluids. With known types of volume flow meters or turbine meters, the pulse signal is in proportion to the flow rate and, if not corrected to reflect any departure from a base or standard temperature condition, will not, when integrated, provide an accurate flow volume measurement.

In a preferred embodiment of the present invention, the flow pulses from a flow transmitter such as a volume flow meter or a turbine meter are digitally converted into a reference temperature, for example, 15° Centigrade (C.), flow rate, depending upon the temperature sensitive resistance measured temperature (t) and volume coefficient ($\alpha$). The temperature compensation is accomplished by the following equation:

E (volume conversion coefficient) = $1 - \alpha(t - 15°C.)$

In this system embodiment, the temperature compensation system has a compensating range of $E = 1_{-0.125}^{+0.124}$ The temperature compensation system of the present invention includes an R/V converter which converts a change in the resistance of a platinum temperature-sensitive resistance element into voltage, an integrating type A/D converter and a coefficient multiplier whose coefficient is determined according to the A/D converted result.

In accordance with the present invention the desired temperature compensation is effectively obtained by multiplying the actual measurement of the stream or conduit flow rate by a volume conversion coefficient or factor greater than unity in the case of a fluid temperature above the base or standard temperature, for example 15° C., and by a volume conversion coefficient or factor greater than unity in the case of fluid temperature below 15° C. The relation between the volume conversion factor and fluid temperature generally is of a non-linear character.

An object of the present invention is to provide a temperature compensating system for flow meters or the like in which the nonlinear character of the volume correction coefficient or factor is taken into consideration thereby more accurately or precisely to refer the fluid measurement at the existing or ambient temperature to a base or reference temperature.

Another object of the present invention is to provide a temperature compensating system for flow meters in which flow measurements are made at the existing or ambient temperature and the fluid temperature departure from the base or standard condition is detected by means of an inert temperature sensitive resistive element, for example, a platinum resistance element, and in which more precise temperature compensation is obtained by taking into consideration a non-linear characterisitc of the temperature sensitive resistive element.

Another object of the present invention is to provide a novel temperature compensating system characterized by significant reduction in errors tending to result from the non-linear characteristic of, for example, a platinum temperature measuring resistive element.

A further object of the present invention is to provide such a temperature compensating system wherein an analog signal corresponding to the volume conversion factor is converted to a corresponding digital value before being used for the temperature compensation operation.

BRIEF DESCRIPTION OF THE DRAWINGS

A better understanding of the present invention may be had from the following detailed description when read in connection with the accompanying drawings wherein.

DETAILED DESCRIPTION OF THE EMBODIMENTS

Figure 4:
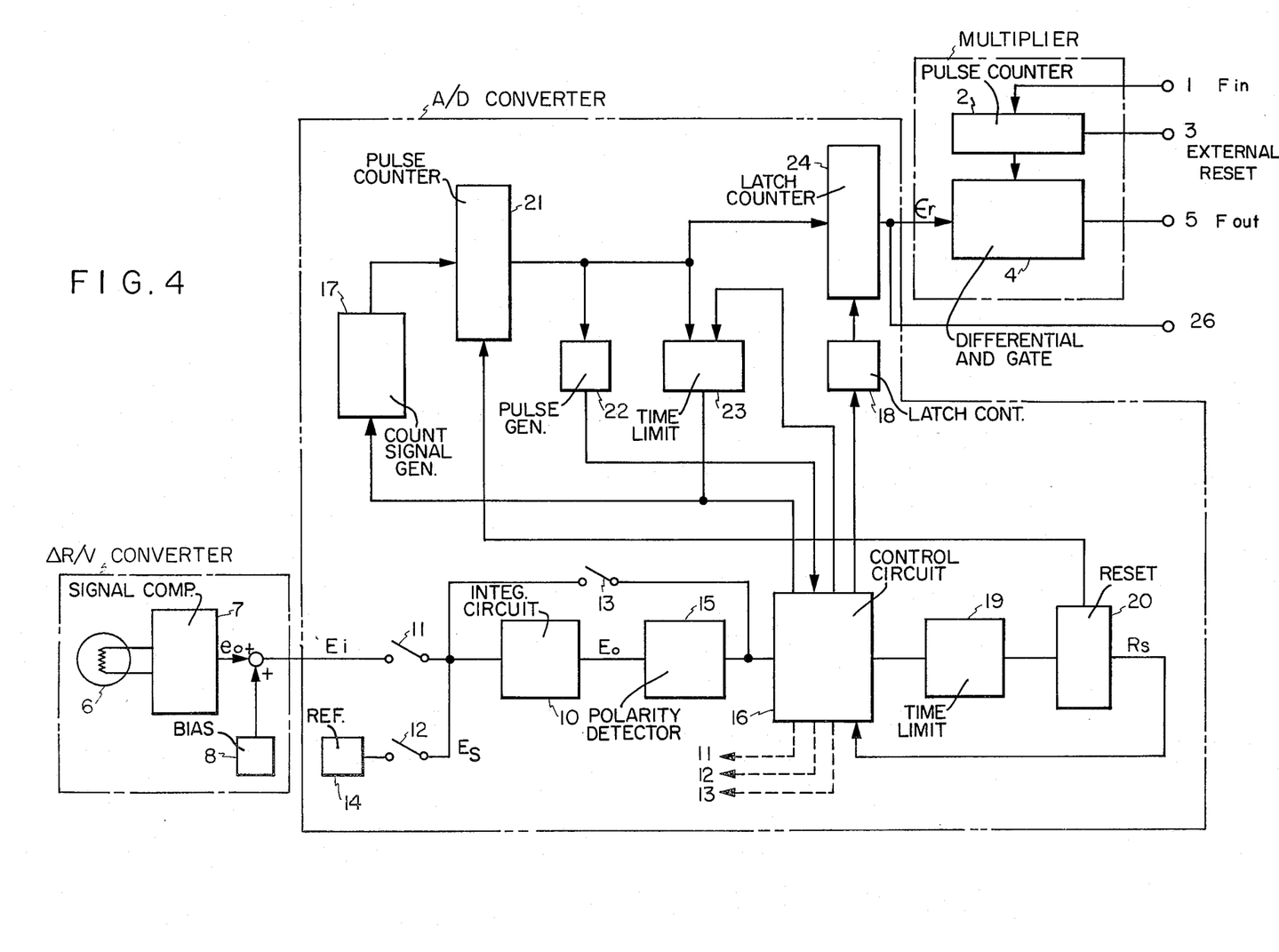
FIG. 4 is a block diagram showing an embodiment of the temperature compensating system according to the invention as applied to a flow meter.
Figure 5:
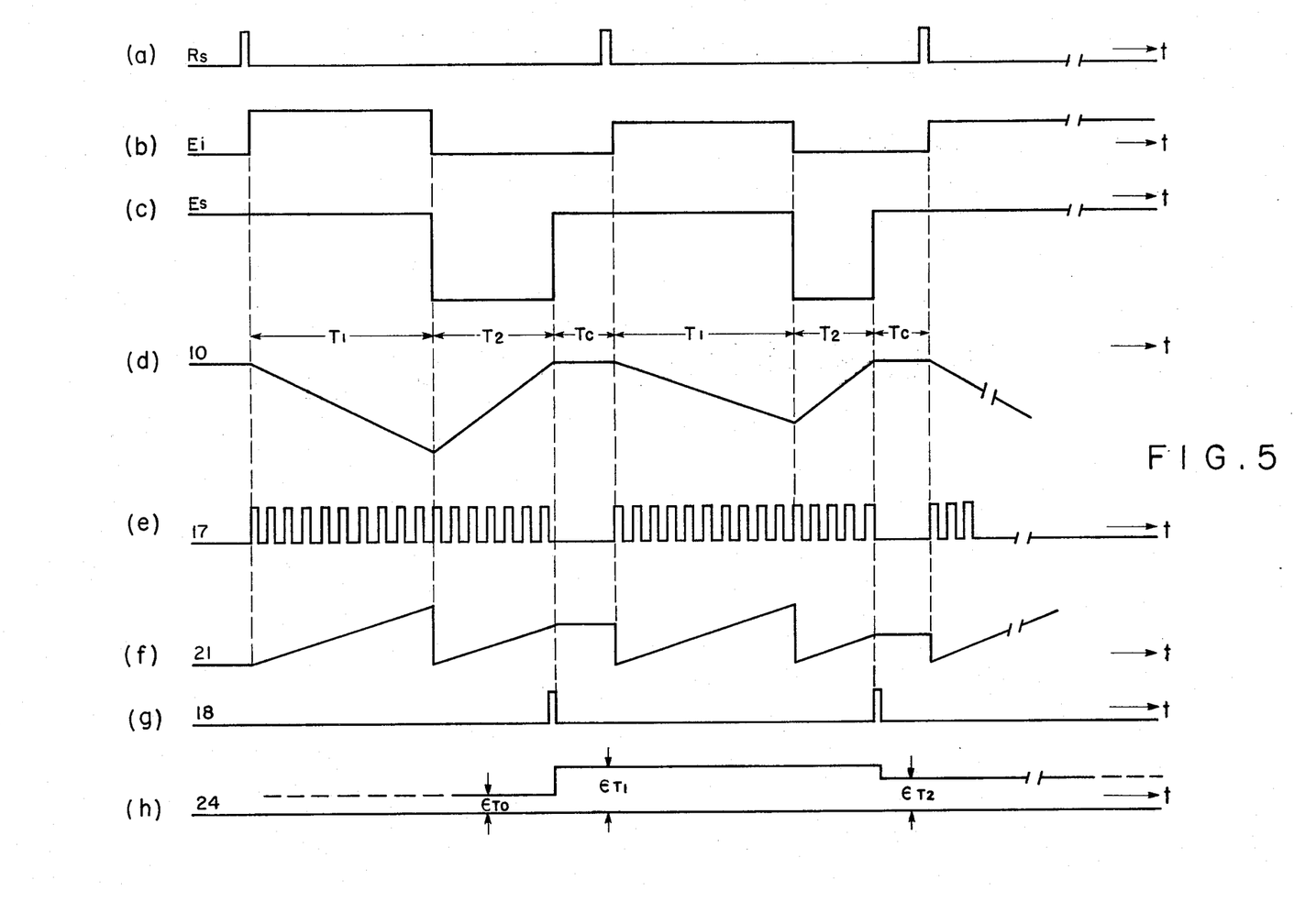
FIG. 5 is a chart illustrating the operation of the temperature compensating system illustrated in FIG. 4.

The overall construction and operation of the system according to the invention will first be described by reference to FIGS. 4 and 5. FIG. 4 shows a block diagram of an embodiment of the temperature compensating system. FIG. 5 shows an operational waveshape chart of the system shown in FIG. 4. Referring to FIG. 4, terminal 1 designates a process fluid flow signal input terminal. A pulse signal Fin proportional to the fluid flow under measurement is coupled to the terminal 1. Such a signal may be derived, for example, from a known type volume flow meter or a turbine meter. A pulse counter 2 counts the flow pulse signal Fin and can be reset by an external reset signal applied to a reset terminal 3. A circuit 4 comprises a differential circuit and a gate circuit. The circuit 4 together with the pulse counter 2 forms a Multiplier for multiplying the flow pulse signal Fin by a desired coefficient or factor Et. The product Fout of the multiplication Et·Fin is applied by the circuit 4 to an output terminal 5.

A temperature-sensitive resistance element 6, for example, a platinum temperature-sensitive measuring resistor is disposed as required to measure the temperature of the process or other fluid or product, the flow and volume of which are under measurement. A platinum resistance element is desirable because of its greater accuracy than nickel elements, for example, and also because of its inert characteristics. The temperature-sensitive resistor element 6, together with a signal compensation circuit 7 and a bias adjustment circuit 8 comprises a ΔR/V converter. The ΔR/V converter is employed to convert the resistance and changes therein of the temperature-sensitive resistive element 6 into a corresponding voltage signal, that is, an analog voltage signal indicated as Ei. This analog voltage signal Ei corresponds in value to the temperature of the process or other fluid under measurement and is employed as an input signal corresponding to the volume conversion factor for an A/D converter, corrected by the volume conversion factor.

The A/D (analog-to-digital) converter is provided for converting the input signal Ei into a corresponding digital value. It is noted that fast response speed is not required for process fluids whose constants change slowly with changing temperature. Therefore, an integral type A/D converter that is capable of removing of periodic noise is satisfactory. Hence, an analog-to-digital converter of the integral type is illustrated as an example. A conventional integrating circuit 10 comprises an operational impedance element consisting of a resistor and capacitor and a direct current amplifier having a high amplification factor. Associated with the integrating circuit 10 are high precision electronic switches 11, 12 and 13. The switch 11 is provided for switching the input signal Ei to the input of the integrating circuit 10. The switch 12 is provided for switching a reference signal Es to the input of the integrating circuit 10, the switch 13 is provided for resetting the integrating circuit 10.

A polarity detection circuit 15 is used to compare a reference level (adjustable level) and an output signal from the integrator. A controlling circuit 16 is provided for operating the switches 11, 12 and 13, for triggering a count signal generator 17, and for controlling a latch control circuit 18. A time-limit circuit 19 is used to provide a time-delay operation.

An initializing or reset circuit 20 is connected to the output of the time-limit circuit 19. The initializing or reset signal is indicated as Rs. A pulse counter 21 is provided for counting the count signal from the count signal generator 17. The pulse counter 21 is reset by the reset circuit 20.

A pulse generator 22 is provided for producing a signal to effect the switching of the integrator 10 from the integration of the input signal Ei over to the integration of the reference voltage signal Es. A second time-limit circuit 23 is used to provide a second time-delay operation as described hereinafter.

A latch counter circuit 24 is used to read the count content of the pulse counter circuit 21 under the control of a signal from the latch control circuit 18 and to apply this count signal to the Multiplier, and also to an output terminal 26. The output terminal 26 is arranged for connection to an associated external apparatus (not shown) such as a factor indicator.

MODE OF OPERATION OF EMBODIMENTS

The operation of the temperature compensating system illustrated in FIG. 4 will be described first in the following description with reference to both the circuit of FIG. 4 and to the operational chart or typical operational wave shape curves of FIG. 5. In presenting these illustrative curves, ideal conditions are assumed for the purpose of simplifying the explanation.

Indicated at line (a) in FIG. 5 is the reset signal Rs at the output of the reset or initializing circuit 20. At line (b) the input signal Ei is shown. Line (c) shows the reference voltage Es. Line (d) illustrates the output signal Eo of the integrating circuit 10. These wave forms, as shown, are drawn with respect to a common time axis.

When the reset or initializing circuit 20 produces an output signal, the switch 11 is turned on or closed. The switches 12 and 13 are then both turned off or opened. The closure of the switch 11, as indicated, allows the integration and conversion to digital form of the input signal Ei to be effected by the integrating circuit 10 and the A/D converter. Thus, closure of switch 11 applies the input signal to the integration circuit 10. This is effected by operation of the switch 11 by the controlling circuit 16. The operation of the controlling circuit 16 simultaneously triggers the reset circuit 20 to set the pulse counter circuit 21 to a full, or predetermined, count. The integration of the input signal Ei occurs during the integrating period T1. The count signal generator 17 concurrently is activated by controlling circuit 16 to effect a countdown of the pulse count circuit 21. This countdown sets the integration time of the input signal Ei. The output signal Eo of the integration circuit changes from the reference level as indicated in curve (d) of FIG. 5. When the count in the pulse counter circuit 21 reaches zero, this state is detected by trigger pulse generator 22. The pulse generator 22 then produces a pulse to actuate the controlling circuit 16 to open the switch 11 and to close the switch 12. This effects a substitution of the reference voltage signal Es for the input signal Ei at the input of the integration circuit 10. The reference voltage signal Es is of the opposite polarity to that of the input signal Ei. At this time, the switch 13 remains open.

Upon the application of the reference voltage Es to the integration circuit 10, the output signal Eo of the integration circuit is returned toward the reference level as shown in curve (d) in FIG. 5. The time period T2 from the start of the application of the reference voltage Es until the output signal Eo of the integration circuit 10 returns to the reference level is proportional to the integral of the input signal Ei. During this time T2 the counter circuit 21 counts pulses from the count signal generator 17. The total count in the counter circuit 21 at the time when the output signal Eo reaches the reference level corresponds to the input signal Ei and is in the form of a digital value. The attainment of the reference level by the output signal Eo is sensed by the polarity detection circuit 15, which then actuates the controlling circuit 16. The controlling circuit 16 responds by opening the switch 12 and closing the switch 13, while at the same time triggering the latch control circuit 18 to cause the latch counter circuit 24 to read the count content of the counter circuit 21. Simultaneously, the controlling circuit 16 stops the oscillation of the count signal generator 17, as is shown in curve (e) in FIG. 5. Additionally, the time-limit circuit 19 is actuated so that a constant time Tc after the reference level is reached by the output signal Eo, the reset circuit 20 is actuated to produce the reset signal Rs, as described above. The above-described sequence of operations is then repeated at a high rate to achieve high accuracy in the determination of the volume correction factor.

The digital value that is read out by the latch counter circuit 24 is shown in curve (h) in FIG. 5. This value is the volume correction factor Et which has been mentioned above. Thus, for a period of time until the next successive value of the factor Et is obtained, the flow pulse signal Fin applied to terminal 1 is multiplied by this present correction factor. The correction factor Et is updated for each successive analog-to-digital conversion. In this way, the flow of the process fluid is temperature compensated, and the temperature compensated value at the base of standard temperature is indicated.

The second time-limit circuit 23 is provided for stopping the oscillation of the count signal generator 17 for the purpose of holding the full count state in case the integrating period T2 should, due to some abnormality, be extended beyond the normal time required for the pulse counter circuit 21 to obtain the full count.

The ΔR/V converter for converting the signal developed by the temperature measuring resistor 6 includes, as noted, the signal compensating circuit 7 and bias adjustment circuit 8. This ΔR/V converter is effective, as will now be explained, to compensate for linear distortion between the resistance changes of the temperature sensitive resistive element 6 and the temperature of the process fluid under measurement, thereby providing an input Ei corresponding with high precision to the desired volume conversion factor Et.

Figure 6:
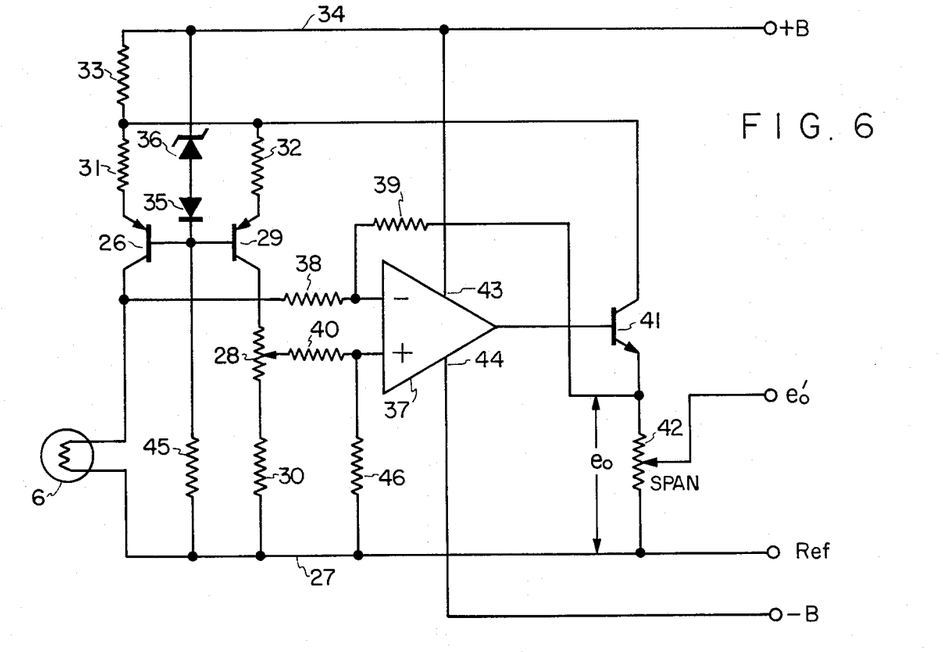
FIG. 6 is a detailed circuit diagram of a converter employed in the system of FIG. 4 for converting resistance change into a corresponding voltage change.

FIG. 6 illustrates a preferred embodiment of the signal compensating circuit 7 that is employed in the ΔR/V converter.

In FIG. 6, the numeral 6 indicates the temperature-sensitive measuring resistance which is disposed in the process fluid for measuring the temperature of the latter. The resistance 6 is shown connected between the collector of a transistor 26 and a reference conductor on line 27. A zero adjustment variable resistor 28 has one end connected to the collector of a transistor 29 and the other end connected by a resistor 30 to the reference line 27. The emitters of transistors 26 and 29 are connected through respectively associated resistors 31 and 32 to one end of a feedback resistor 33. The other end of resistor 33 is connected to a conductor 34 and thereby to the positive terminal of a voltage source +B. The bases of the transistors 26 and 29 are connected to the conductor 34 through a series connection comprising a diode 35 and a Zener diode 36, and are connected to the conductor 27 through a resistor 45. The transistors 26 and 29, resistors 31, 32, and 33, diode 35 and Zener diode 36 form two adjustable constant current circuits having substantially the same characteristics. These current source circuits also provide respective output currents which vary substantially equally with change in current flowing through the feedback resistor 33.

A differential input direct current operational amplifier circuit 37 consists of a semiconductor integrated circuit. The circuit 37 together with resistors 38, 39 and 40, 46 constitute an operational amplifier circuit. The output signal of the amplifier 37 is applied to the base of a transistor 41. The collector of the transistor 41 is connected through the feedback resistor 33 to the voltage source +B. The emitter of the transistor 41 is connected through a span adjustment variable resistor indicated at 42 to the reference conductor 27. Drive voltages are supplied to respective voltage source terminals 43 and 44 of the amplifier 37 from voltage source +B and −B, respectively.

With the arrangement illustrated in FIG. 6, a voltage produced across the temperature measuring resistor 6 is coupled to an inverting input terminal of the operational amplifier circuit 37, while a zero adjustment voltage from the slide terminal of the adjustable resistor 28 is coupled to a non-inverting input terminal of the operational amplifier circuit 37. The latter terminal is connected by a resistor 46 to the conductor 27. The zero adjustment voltage herein mentioned refers to a voltage adjusted such that the differential input voltage ei is zero at the upper limit Tmax of the temperature range (temperature span), as illustrated by the curves of FIG. 3.

The operation of the signal compensating circuit illustrated in FIG. 6 will now be described.

Figure 3:
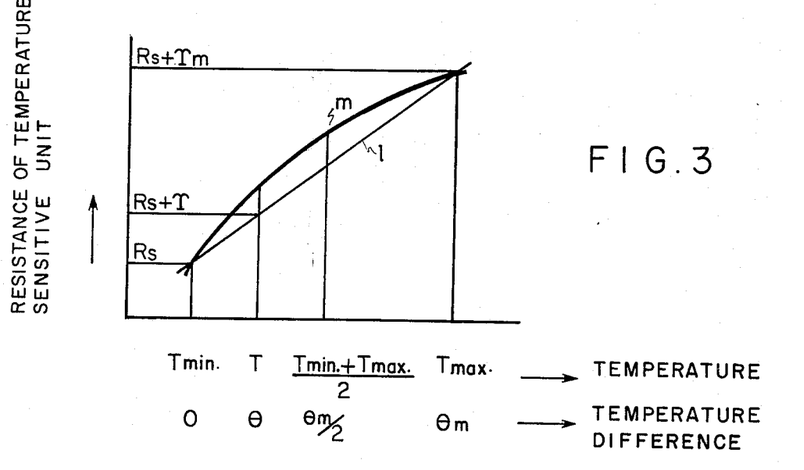
FIG. 3 is a graph showing the relation between the resistance of a temperature measuring resistive element and the temperature thereof.

The following discussion is based on a temperature span, as illustrated in FIG. 3, having a lower limit temperature Tmin and an upper limit temperature Tmax. The resistance of temperature sensitive resistor 6 corresponding to the lower limit temperature Tmin is denoted by Rs and the resistance thereof corresponding to the upper limit temperature Tmax is denoted by Rs+γm. The adjustable resistor 28, as seen on FIG. 6, is adjusted such that the input voltage ei supplied to the operational circuit 37 is zero at the upper limit temperature Tmax. This may be referred to as a zero adjustment. For this adjustment, the resistance of the temperature measuring resistor 6 at a certain temperature T(Tmin ≤ T ≤ Tmax), within the aforementioned temperature range, is denoted by Rs +γ, where γ is the change of resistance corresponding to the temperature difference $\theta$ ($\theta = T - Tmin$). The output currents of the two above-mentioned adjustable constant-current circuits, which, as noted, can be regarded as being substantially the same, can be expressed as:

Is - at the lower limit temperature Tmin,
Is + im - at the upper limit temperature Tmax and
Is + i - at the temperature T.

The input voltage ei then supplied to the operational circuit at temperature T may be expressed as:

$$ei = (\gamma - \gamma m)(Is + i) \qquad (1)$$

The amplification factor of the operational circuit may be denoted by K, where:

$$K = -\frac{R39}{R38} \qquad (2)$$

Thus, the output voltage eo may be expressed as:

$$eo = -Kei = -K(\gamma - \gamma m)(Is + i) \qquad (3)$$

Assuming that the gain of the transistor 41 is sufficiently high, the collector current io in this transistor at temperature I is;

$$io = \frac{eo}{R42} \qquad (4)$$

where R42 is the resistance of resistor 42. The flow of this collector current through the feedback resistor 33 produces a voltage drop that is effective to change the current in the aforementioned variable constant-current circuits ($io=0$ when $ei=0$). This relation can be roughly expressed as:

$$i = im - k \cdot R33 \cdot io \quad (k: \text{positive constant}) \qquad (5)$$

where R33 is the resistance of the feedback resistor 33.

Thus, from equations 3, 4 and 5 the output voltage eo of the ΔR/V circuit is:

$$eo = \frac{-K(Is+im)(\gamma - \gamma m)}{1 - \frac{kKR33}{R42}(\gamma - \gamma m)}$$

$$= \frac{-\alpha(\gamma - \gamma m)}{1 - BR33(\gamma - \gamma m)} \qquad (6)$$

where $\alpha = K(Is+im)$ and $B = KK/R42$.

Figure 8:
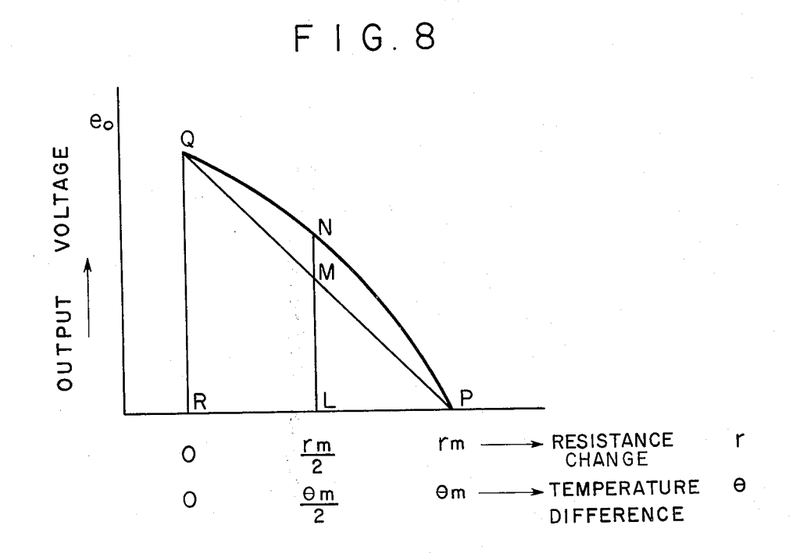
FIGS. 8 and 9 illustrate characteristics of the circuits of FIGS. 6 and 7.

Equation 6 is illustrated as a plot in FIG. 8. As there shown, the output voltage eo bears an upward or convex non-linear relation to the resistance change γ of the temperature measuring resistor 6. Defining the linear distortion ε as:

$$\epsilon = \frac{\overline{NL} - \overline{ML}}{\overline{QR}}$$

$$\frac{BR33 \, \gamma m}{2(2+BR33 \, \gamma m)} > 0 \qquad (7)$$

This linear distortion increases in the positive direction as the magnitude of the feedback resistance 33 is increased.

Thus, where the resistance of the temperature measuring resistor 6 linearly increases with temperature, for instance as in the case of line 1 in FIG. 3.

$$\gamma = \frac{\gamma m}{\theta m} \theta$$

The relation of the output voltage eo derived by substituting this equation into equation (6) to the temperature $\theta$ (taken along the abscissa) also has the same upward or convex non-linear character as the curve in FIG. 8.

Figure 2:
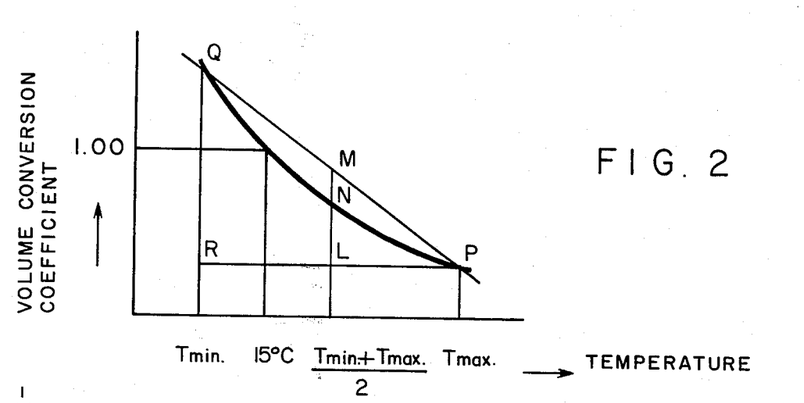

Thus, by selecting the feedback resistance 33 such that the distortion ε from linearity is equal to the distortion η from linearity of the volume conversion factor as shown in FIG. 2 and given as $$\eta = \frac{\overline{NL} - \overline{ML}}{\overline{QR}}$$

and adjusting the bias component corresponding to the present temperature for the volume conversion factor by the bias adjustment circuit 8, therre is obtained, with high precision, a linearized input voltage Ei corresponding to the volume conversation factor.

Figure 7:
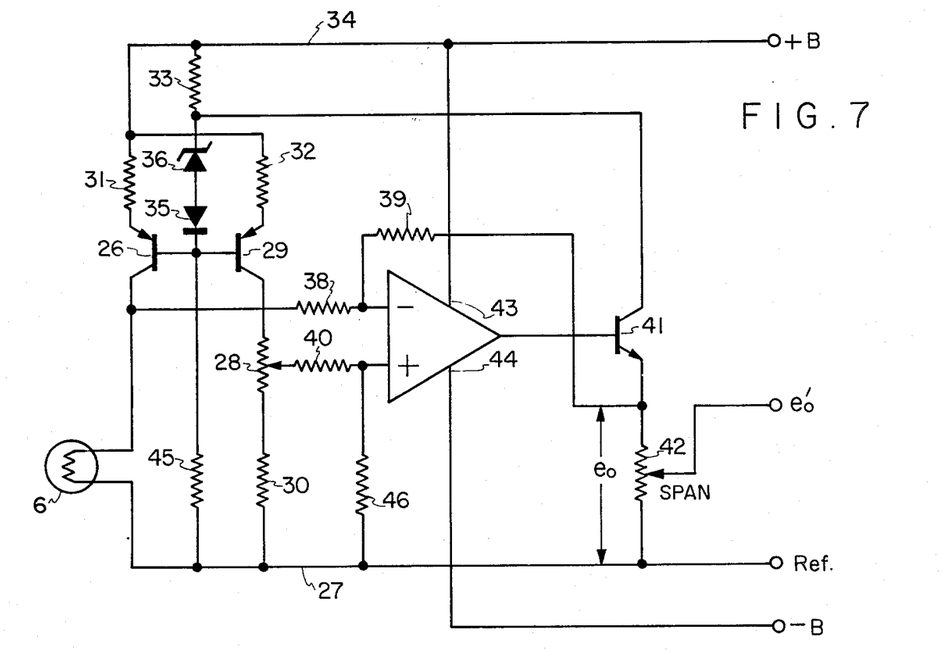
FIG. 7 illustrates a modification of the circuit diagram of FIG. 6.
Figure 9:
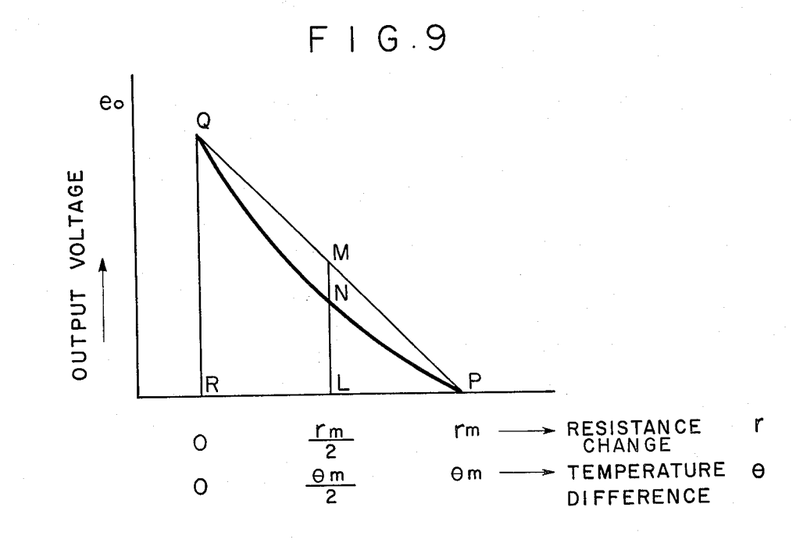

FIG. 7 shows a modified embodiment of the signal compensating circuit 7 in which the volume conversion factor has a downward or concave character as shown in FIG. 2. The circuit of FIG. 7 is different from that of FIG. 6 in that the emitters of transistors 26 and 29 are connected by their respectively associated resistors 31 and 32 directly to the voltage source +B, the commonly connected bases of transistors 26 and 29 are connected through a series circuit of a diode 35 and a Zener diode 36 to the collector of transistor 41, and the collector of the transistor 41 is connected through the feedback resistor 33 to the voltage source +B. With this circuit connection, the output voltage eo bears a downward concave non-linear relation to the resistance change, as shown in FIG. 9, and the distortion from linearity is increased in the negative direction by increasing the feedback resistance 33.

Figure 1:
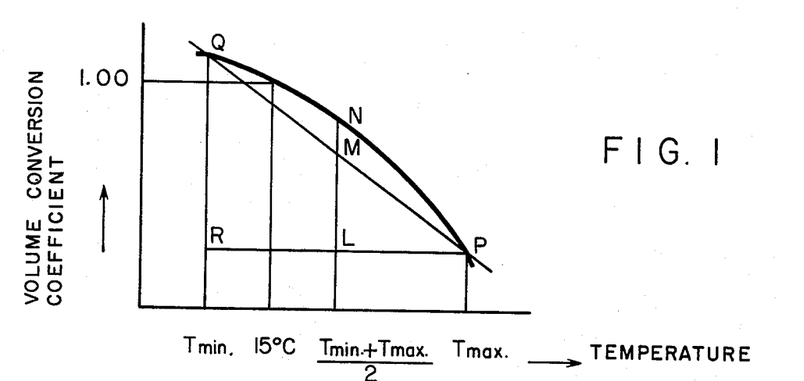
FIGS. 1 and 2 are graphs showing the relation between the volume conversion factor of fluids and the temperature thereof.

Thus, similar to the case of FIG. 1, by appropriate selection of the feedback resistance 33 it is possible to obtain an input voltage Ei that precisely corresponds to the volume conversion factor at a certain preset base or standard temperature, as seen in FIG. 2. With a platinum temperature measuring resistor, the resistance changes as in curve m in FIG. 3. Even in this case, linearization can be readily obtained by removing the linear distortion of the resistance change if the feedback resistance 33 of either of FIGS. 6 and 7 is appropriately set. By so doing, the feedback resistance may subsequently be set again in the manner as described above for matching the distortion from linearity of the desired volume conversion factor. In practice, the feedback resistance is set by simultaneously taking the distortion from linearity of the temperature measuring resistor and the distortion from linearity of the volume conversion factor into consideration. The resistor 42 in the circuits of FIGS. 6 and 7 is a variable resistor for obtaining a desired span adjusted voltage eo'.

While in the illustrated embodiment the integrating period T1 has been indicated as a constant time interval of that duration required for the count signal to be fully counted by the pulse counter circuit, this time interval may be suitably selected by using a preset counter as well.

Thus, the apparatus according to this invention provides an input signal Ei compensated with high precision for the non-linear characteristic of the temperature measuring resistor and having the desired character to meet the linear distortion of the volume conversion factor. As those skilled in the art will understand, such an arrangement enables the setting of a broader temperature span. Also, since current from a current source is used for converting the resistance change of the temperature measuring resistor 6 into a corresponding voltage signal, the tendency to errors due to wiring resistance of the temperature measuring resistive element is minimized as compared to errors tending to result when the conversion into the electric signal is effected by using a voltage circuit. Further, the preset or base temperature can be readily changes by manipulating the bias adjustment circuit 8.

Furthermore, since the circuit 4 consists of a differential circuit for differentiating each bit output of the pulse counter 21 and gate circuit taking the logic of the differential pulse and output of the A/D converter, it is possible to extend the range of the conversion factor without sacrifice in the precision by increasing the number of bits of the pulse counter 21 and by increasing the digital value corresponding to the input signal to the A/D converter, so that the alteration and adjustment of the range can be readily effected.

The Multiplier may comprise a semiconductor integrated circuit such as the commercially available Model SN 7497 that is manufactured and sold by Texas Instruments Incorporated.

It will be evident that since the temperature compensating system according to the invention consists of ΔR/V converter, an A/D converter and a Multiplier, the desired temperature compensation can be effected for a plurality of separate fluid flows under measurement notwithstanding that the individual fluids have different temperature coefficients of expansion and vary differently in volume with temperature variations, with the same A/D converter and Multiplier. This enhanced utility may be obtained by employing a separate ΔR/V converter for each of the fluid flows under measurement and selectively connecting each such ΔR/V converter in turn to the A/D converter by a suitable switching mechanism. For such applications, the invention is very economical and useful.

While the foregoing description has been concerned with the measurement of flow, the present invention is by no means limited to the above apparatus embodiment, and may be applied to any measurement where the constant of the measured product or subject varying with temperature and other factors is converted into a pulse signal.

Thus, there has been provided according to the present invention a temperature compensating system in which the measurement of a product at a preset or base temperature can be made precisely irrespective of the actual temperature of the product, and which is of great utility for the measurement of fluids or other products having constants changing with temperature or other factors.

The embodiments of the invention in which an exclusive property or privilege is claimed are defined as followed:

1. In a system for measuring a quantity in terms of a pulse signal corresponding to the measurement, which measurement is subject to error due to environmental changes to which said quantity is exposed, a compensating system to produce a conversion coefficient for referring said measurement to a reference base or standard environmental condition, said compensating system including a transducer having a non-linear response characteristic for providing an output in accordance with said changes, a converter responsive to said transducer for producing an electrical signal in accordance with said changes, said converter including means having a non-linear response characteristic similar to said non-linear response characteristic of said transducer and connected to oppose and neutralize the effect of the non-linearity of said transducer whereby said electrical signal is free from the said non-linear characteristic of said transducer, an analog-to-digital converter to convert said electrical signal into a corresponding digital value, said digital value being representative of said conversion coefficient and means to multiply said pulse signal by said digital value to compensate said pulse signal thereby to provide an output pulse signal that is referred to said base or standard environmental condition, said transducer being a temperature-sensitive resistance, said first-mentioned converter including a bridge circuit having said temperature-sensitive resistance connected in one arm thereof, means including a series resistor for connecting a source of voltage across the energizing terminals of said bridge, an operational amplifier having an inverting input and a non-inverting input and an output, means connecting said inverting input of said operational amplifier to an output junction of said bridge which is directly connected to said temperature-sensitive resistance, means connecting an opposing output junction of said bridge to said non-inverting input of said operational amplifier, and an output circuit connected to the output of said operational amplifier to produce a voltage representative of the output from said operational amplifier, said output circuit being connected to said voltage source through said series resistor.

2. In a system as specified in claim 1 and wherein the said opposing output junction of said bridge comprises the movable contact of an adjustable potentiometer resistance.

3. In a system as specified in claim 1 and wherein said temperature-sensitive resistance is a platinum temperaturesensitive resistance element.

4. In a system as specified in claim 1 including a first constant current source connected between said first mentioned bridge output junction, and said series resistor, and a second constant current source connected between said mentioned bridge output junction and said series resistor.

5. In a system for measuring a quantity in terms of a pulse signal corresponding to the measurement, which measurement is subject to error due to environmental changes to which said quantity is exposed, a compensating system to produce a conversion coefficient for referring said measurement to a reference base or standard environmental condition, said compensating system including a transducer having a non-linear response characteristic for providing an output in accordance with said changes, a converter responsive to said transducer for producing an electrical signal in accordance with said changes, said converter including means having a non-linear response characteristic similar to said non-linear response characteristic of said transducer and connected to oppose and neutralize the effect of the non-linearity of said transducer whereby said electrical signal is free from the said non-linear characteristic of said transducer, an analog-to-digital converter to convert said electrical signal into a corresponding digital value, said digital value being representative of said conversion coefficient and means to multiply said pulse signal by said digital value to compensate said pulse signal thereby to provide an output pulse signal that is referred to said base or standard environmental condition, said transducer being a temperature-sensitive resistance, said first-mentioned converter including a bridge circuit having said temperature-sensitive resistance in one arm thereof, connecting means for connecting a source of voltage across the energizing terminals of said bridge, an operational amplifier having an inverting input and a non-inverting input and an output, means connecting said inverting input of said operational amplifier to an output junction of said bridge which is directly connected to said temperature-sensitive resistance, means connecting an opposing junction of said bridge to the non-inverting input of said operational amplifier, a first constant current source connected between said first-mentioned bridge output junction and said connecting means, a second constant current source connected between said second-mentioned bridge output junction and said connecting means, means for controlling said first and second mentioned constant current sources including a resistor connected to said connecting means, and an output circuit connected to the output of said operational amplifier to produce a voltage representative of the output of said operational amplifier, said output circuit being connected to said connecting means through said resistor.

6. In a system as specified in claim 5 and wherein the said opposing output junction of said bridge comprises the movable contact of an adjustable potentiometer resistance.

7. In a system as specified in claim 5 and wherein said temperature sensitive resistance is a platinum temperaturesensitive resistance element.

\* \* \* \* \*

UNITED STATES PATENT OFFICE
CERTIFICATE OF CORRECTION

Patent No. 3,905,229          Dated September 16, 1975

Inventor(s) Masaaki Togo et al.

It is certified that error appears in the above-identified patent and that said Letters Patent are hereby corrected as shown below:

Assignee should read -- Yamatake-Honeywell Company Limited, Tokyo, Japan --.

Signed and Sealed this twenty-third Day of December 1975

[SEAL]

Attest:

RUTH C. MASON
*Attesting Officer*

C. MARSHALL DANN
*Commissioner of Patents and Trademarks*